United States Patent
Hyodo (10) Patent No.: US 12,473,960 B2
(45) Date of Patent: Nov. 18, 2025

(54) ANTIVIBRATION DEVICE PRODUCTION METHOD, STOPPER FOR ANTIVIBRATION DEVICE, AND ANTIVIBRATION DEVICE

(71) Applicant: Prospira Corporation, Kawasaki (JP)

(72) Inventor: Akimitsu Hyodo, Kawasaki (JP)

(73) Assignee: Prospira Corporation, Kanagawa (JP)

( * ) Notice: Subject to any disclaimer, the term of this patent is extended or adjusted under 35 U.S.C. 154(b) by 445 days.

(21) Appl. No.: 18/254,656

(22) PCT Filed: Sep. 7, 2021

(86) PCT No.: PCT/JP2021/032900
§ 371 (c)(1),
(2) Date: May 26, 2023

(87) PCT Pub. No.: WO2022/113467
PCT Pub. Date: Jun. 2, 2022

(65) Prior Publication Data
US 2024/0011539 A1   Jan. 11, 2024

(30) Foreign Application Priority Data

Nov. 26, 2020   (JP) ................. 2020-196350

(51) Int. Cl.
*F16F 15/08* (2006.01)
*B60G 7/02* (2006.01)
*F16B 5/07* (2006.01)

(52) U.S. Cl.
CPC ............ *F16F 15/08* (2013.01); *B60G 7/02* (2013.01); *F16B 5/07* (2013.01);
(Continued)

(58) Field of Classification Search
CPC ...... F16F 1/3814; F16F 1/3842; F16F 1/3828; F16F 15/08; F16F 2226/02;
(Continued)

(56) References Cited

U.S. PATENT DOCUMENTS

2012/0261942 A1* 10/2012 Benedetti ............. F16B 21/086
                                                              296/146.7
2017/0059060 A1*  3/2017 Gallion ................... H02G 3/32
(Continued)

FOREIGN PATENT DOCUMENTS

CN   201059312 Y   5/2008
CN   107407316 A   11/2017
(Continued)

OTHER PUBLICATIONS

May 28, 2025, search result of the Office Action issued by the China National Intellectual Property Administration in the corresponding Chinese Patent Application No. 202180079580.6.
(Continued)

*Primary Examiner* — Robert A. Siconolfi
*Assistant Examiner* — San M Aung
(74) *Attorney, Agent, or Firm* — KENJA IP LAW PC (57) ABSTRACT

Provided are an anti-vibration device manufacturing method, a stopper for an anti-vibration device, and an anti-vibration device all of which prevent easy separation between the stopper and the bracket while improving the ease of fastening the stopper and the bracket together. The anti-vibration device manufacturing method is a method for obtaining the anti-vibration device. The stopper can be formed, by applying a coating agent C, which is configured to be peelable after solidification, to at least a bulging portion (12) of a positioning protrusion (10) of the stopper. The anti-vibration device can be formed, by pressing the bulging portion (12) into a positioning hole A1 formed in the bracket 5, so that the bulging portion (12) is prevented from detaching from the bracket (5), using the stopper after solidification of the coating agent C.

10 Claims, 4 Drawing Sheets

(52) U.S. Cl.
CPC .. *B60G 2204/4108* (2013.01); *B60G 2206/82* (2013.01); *F16F 2226/02* (2013.01)

(58) Field of Classification Search
CPC ... F16F 2226/044; F16F 2230/04; F16B 2/22; F16B 4/004; F16B 5/07; F16B 9/07; F16B 9/056; F16B 21/086; F16B 2200/79; B60G 7/02; B60G 2206/91; B60G 2204/41; B60G 2204/4108; B60G 2206/82
USPC ..................................................... 267/140.11
See application file for complete search history.

(56) References Cited

U.S. PATENT DOCUMENTS

| | | | |
|---|---|---|---|
| 2017/0298970 A1 | 10/2017 | Bourges et al. | |
| 2020/0149566 A1 | 5/2020 | Bourges et al. | |
| 2020/0156519 A1* | 5/2020 | Yu | B60N 2/6009 |

FOREIGN PATENT DOCUMENTS

| | | | |
|---|---|---|---|
| JP | S6132809 U | | 2/1986 |
| JP | H0425013 U | | 2/1992 |
| JP | H0545215 U | | 6/1993 |
| JP | 2001245427 A | | 9/2001 |
| JP | 2001270402 A | | 10/2001 |
| JP | 2003097629 A | * | 4/2003 |
| JP | 2005121150 A | * | 5/2005 |
| JP | 4103763 B2 | * | 6/2008 |
| JP | 2020176675 A | | 10/2020 |

OTHER PUBLICATIONS

Nov. 9, 2021, International Search Report issued in the International Patent Application No. PCT/JP2021/032900.

Sep. 27, 2024, search result of the Extended European Search Report issued by the European Patent Office in the corresponding European Patent Application No. 21897445.9.

May 30, 2023, International Preliminary Report on Patentability issued in the International Patent Application No. PCT/JP2021/032900.

* cited by examiner

ANTIVIBRATION DEVICE PRODUCTION METHOD, STOPPER FOR ANTIVIBRATION DEVICE, AND ANTIVIBRATION DEVICE

TECHNICAL FIELD

The present disclosure relates to an anti-vibration device manufacturing method, a stopper for an anti-vibration device, and an anti-vibration device.

BACKGROUND

A conventional anti-vibration device include an anti-vibration mount in which the stopper body is fastened to the bracket, by pressing a positioning protrusion (insertion portion) of the stopper body (rubber stopper) into a positioning hole (fastening hole) formed in the bracket, so that a bulging portion (flange portion) of the positioning protrusion is prevented from detaching from the bracket (for example, Patent Literature 1).

PATENT LITERATURE

PTL 1: JP 2005-121150 A

SUMMARY

Technical Problem

However, because the positioning protrusion of the conventional anti-vibration device is made of rubber, in a case in which the rubber is low in hardness and too soft, it may deform excessively, and when the bulging portion of the positioning protrusion is pressed into the positioning hole for press-fitting, the press-fit (insertion) characteristics may deteriorate. On the other hand, if a lubricant is applied to the positioning protrusion, the insertion characteristics can be improved. Nevertheless, the use of the lubricant may also decrease the amount of force (hereinafter also referred to as "detaching force") required to detach the positioning protrusion. That is, the conventional anti-vibration device does not prevent easy separation between the stopper and bracket, while improving the ease of fastening the stopper and the bracket together.

It would be helpful to provide an anti-vibration device manufacturing method for obtaining the anti-vibration device in which easy separation between the stopper and the bracket is prevented, while the ease of fastening the stopper and the bracket together is improved, a stopper for an anti-vibration device in which easy separation between the stopper and the bracket is prevented, while the ease of fastening the stopper and the bracket together is improved, and an anti-vibration device in which easy separation between the stopper and the bracket is prevented, while the ease of fastening the stopper and the bracket together is improved.

Solution to Problem

An anti-vibration device manufacturing method according to the present disclosure is an anti-vibration device manufacturing method for obtaining the anti-vibration device including: an anti-vibration body including an inner cylinder, an outer cylinder, and an elastic body connecting the inner cylinder and the outer cylinder; a bracket arranged on one side of the anti-vibration body in an axial direction; and a stopper arranged between the anti-vibration body and the bracket, the anti-vibration device manufacturing method including:

applying a coating agent to at least a bulging portion of a positioning protrusion extending to one side in the axial direction as part of an elastic member provided in the stopper, the coating agent being configured to be peelable after solidification; and after solidification of the coating agent, pressing the bulging portion of the positioning protrusion into a positioning hole formed in the bracket, so as to prevent the bulging portion from detaching from the bracket. According to the anti-vibration device manufacturing method of the present disclosure, it is possible to obtain the anti-vibration device in which easy separation between the stopper and the bracket is prevented, while the ease of fastening the stopper and the bracket together is improved.

In the anti-vibration device manufacturing method according to the present disclosure, the coating agent preferably is a rust inhibitor. In this case, the anti-vibration device manufacturing method is superior in terms of workability and cost-effectiveness.

In the anti-vibration device manufacturing method according to the present disclosure, the coating agent is preferably applied to the entire positioning protrusion. In this case, the anti-vibration device manufacturing method is even more superior in terms of workability and cost-effectiveness.

A stopper for an anti-vibration device is a stopper for an anti-vibration device that is to be used in the anti-vibration device including: an anti-vibration body including an inner cylinder, an outer cylinder, and an elastic body connecting the inner cylinder and the outer cylinder; a bracket arranged on one side of the anti-vibration body in an axial direction; and the stopper arranged between the anti-vibration body and the bracket, the stopper including:

a rigid member having an opening formed therein; and
an elastic member, wherein
the elastic member includes a stopper body configured to cover the rigid member, and a positioning protrusion continuous with the stopper body, and
the positioning protrusion includes a shaft portion extending to one side in the axial direction as part of the stopper body and configured to be able to penetrate a positioning hole formed in the bracket, a bulging portion continuous with an end of the shaft portion so as to be prevented from detaching from the bracket, and a coating portion provided on at least a surface of the bulging portion and configured to be peelable. The stopper for an anti-vibration device according to the present disclosure prevents easy separation between the stopper and the bracket, while improving the ease of fastening the stopper and the bracket together.

In the stopper for an anti-vibration device according to the present disclosure, the coating portion is preferably formed of a rust inhibitor. In this case, the stopper for an anti-vibration device is superior in terms of manufacturability and cost-effectiveness.

An anti-vibration device according to the present disclosure includes:

an anti-vibration body including an inner cylinder, an outer cylinder, and an elastic body connecting the inner cylinder and the outer cylinder;
a bracket arranged on one side of the anti-vibration body in an axial direction; and a stopper arranged between the anti-vibration body and the bracket, wherein the bracket has a positioning hole formed therein that penetrates in the axial direction, the stopper includes a rigid member having an opening formed therein, and an elastic member, the elastic member includes a stopper body configured to cover the rigid member, and a positioning protrusion continuous with the stopper body, and the positioning protrusion includes a shaft portion extending to one side in the axial direction as part of the stopper body and configured to penetrate the positioning hole, a bulging portion continuous with an end of the shaft portion so as to be prevented from detaching from the bracket, and a coating portion provided on at least a surface of the bulging portion and configured to be peelable. The anti-vibration device according to the present disclosure prevents easy separation between the stopper and the bracket, while improving the ease of fastening the stopper and the bracket together.

In the anti-vibration device according to the present disclosure, the coating portion is preferably formed of a rust inhibitor. In this case, the anti-vibration device is superior in terms of manufacturability and cost-effectiveness.

In the anti-vibration device according to the present disclosure, the coating portion is preferably positioned on the surface of the bulging portion that is located on one side in the axial direction. In this case, the coating portion can be visible as a marker indicating that the bracket and the stopper will not easily separate from each other, for example, even when they are handled, with the positioning protrusion being prevented from detaching from the bracket.

Advantageous Effect

According to the present disclosure, an anti-vibration device manufacturing method for obtaining the anti-vibration device in which easy separation between the stopper and the bracket is prevented, while the ease of fastening the stopper and the bracket together is improved, a stopper for an anti-vibration device in which easy separation between the stopper and the bracket is prevented, while the ease of fastening the stopper and the bracket together is improved, and an anti-vibration device in which easy separation between the stopper and the bracket is prevented, while the ease of fastening the stopper and the bracket together is improved can be provided.

DETAILED DESCRIPTION

With reference to the drawings, an anti-vibration device manufacturing method, a stopper of an anti-vibration device, and an anti-vibration device according to an embodiment of the present disclosure will be described below.

Figure 1:
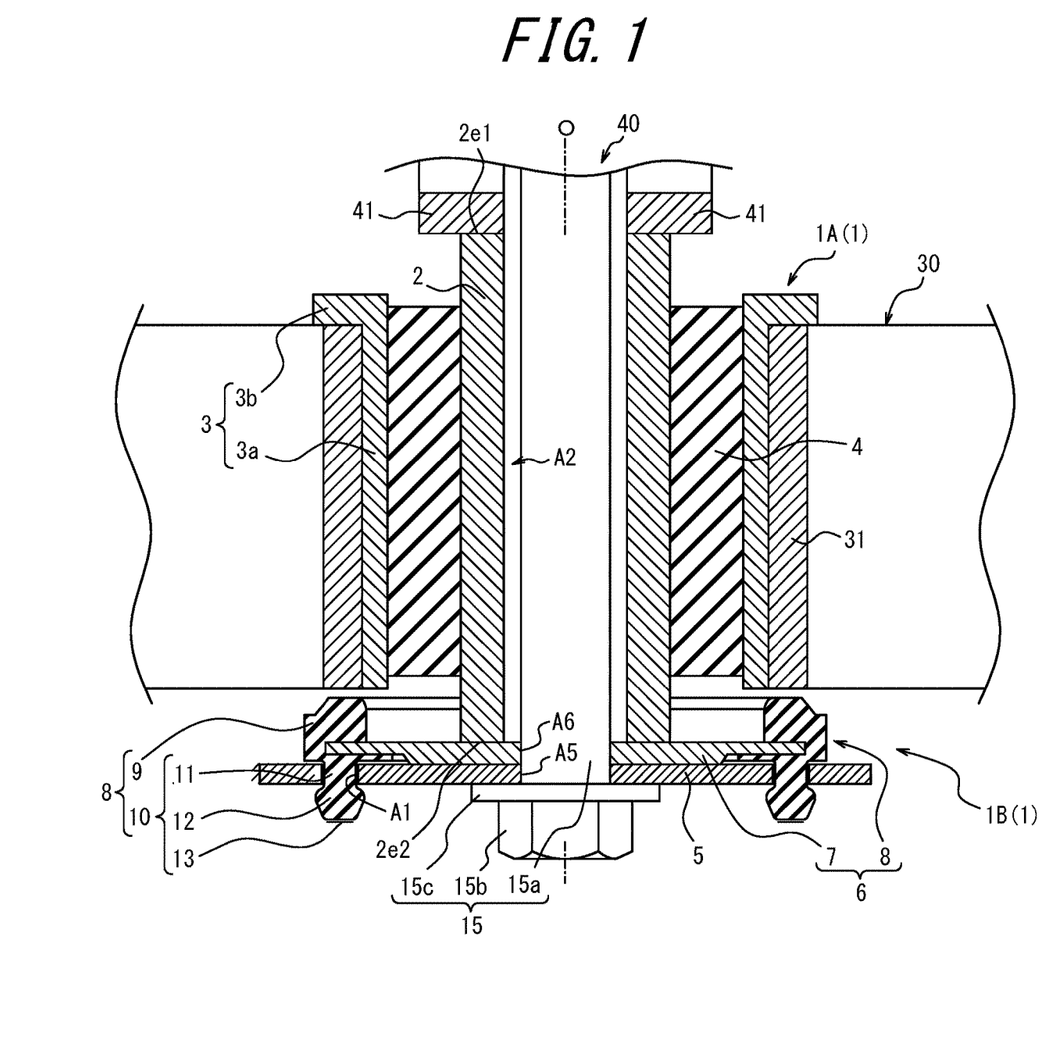
FIG. 1 is a cross-sectional view illustrating an anti-vibration device according to an embodiment of the present disclosure, in a state in which an inner cylinder of the anti-vibration device is attached to a vehicle body and an outer cylinder of the anti-vibration device is attached to a suspension member.

FIG. 1 illustrates an anti-vibration device 1 according to an embodiment of the present disclosure. In this example, the anti-vibration device 1 is a suspension bushing for a vehicle. A suspension member 30 is attached to a vehicle body 40 via the anti-vibration device 1.

FIG. 1 illustrates a plane including an axis line O of the anti-vibration device 1 as a cross-section. In the following description, a direction in which the axis line O extends is referred to as an axial direction. In the following description, a circumferential direction refers to a direction extending around the axis line O.

In the present disclosure, one side in the axial direction refers to either an upper side of the drawing or a lower side of the drawing along the axial direction in FIG. 1. In the following description, it is assumed that a side directed toward the lower side of the drawing along the axial direction (hereinafter also referred to as "downward") is the one side in the axial direction, and a side directed toward the upper side of the drawing along the axial direction (hereinafter also referred to as "upward") is the other side in the axial direction.

Furthermore, in the following description, a direction perpendicular to the axial direction is referred to as a perpendicular-to-axis direction. In the following description, the side directed toward the axis line O is referred to as the inner side in the perpendicular-to-axis direction, and the side directed away from the axis line O is referred to as the outer side in the axial direction.

With reference to FIG. 1, the anti-vibration device 1 includes an anti-vibration body 1A. The anti-vibration body 1A includes an inner cylinder 2, an outer cylinder 3, and an elastic body 4 connecting the inner cylinder 2 and the outer cylinder 3.

The inner cylinder 2 has a through hole A2 extending in the axial direction. A bolt shaft 15a can be passed through the through hole A2, as will be described later. In the present embodiment, the inner cylinder 2 is a cylindrical member having the through hole A2 formed therein. In the present embodiment, the inner cylinder 2 is a cylindrical member. However, the inner cylinder 2, which has the through hole A2 formed therein, is not limited to a cylindrical member.

The outer cylinder 3 is arranged so as to circumferentially surround at least part of the inner cylinder 2. In the present embodiment, the outer cylinder 3 has a body portion 3a extending in the axial direction. A through hole extending in the axial direction is formed inside the body portion 3a. In the through hole, the inner cylinder 2 can be arranged coaxially with the axis line O. In the present embodiment, the outer cylinder 3 has an upper end portion 3b extending to the outer side in the axial direction. In the present embodiment, the upper end portion 3b forms an upper end portion of the body portion 3a and extends annularly in the circumferential direction around the entire circumference.

The elastic body 4 is formed of an elastic material. The elastic body 4 is arranged between the inner cylinder 2 and the outer cylinder 3. The elastic body 4 connects the inner cylinder 2 and the outer cylinder 3.

The anti-vibration device 1 further includes a bracket 5. The bracket 5 is arranged on one side of the anti-vibration body 1A in the axial direction.

The anti-vibration device 1 further includes a stopper 6. The stopper 6 is arranged between the anti-vibration body 1A and the bracket 5.

In the present embodiment, the body 40 is arranged above the anti-vibration device 1, and because it is configured to be screwed upward from below as will be described later, the bracket 5 is arranged below the anti-vibration body 1A. However, for example, in a case in which the body 40 is arranged below the anti-vibration device 1 and configured to be screwed downward from above, contrary to the present embodiment, the bracket 5 can be arranged above the anti-vibration body 1A.

The bracket 5 has positioning holes A1 formed therein that penetrate in the axial direction.

The bracket 5 also has an opening A5 formed therein. The bolt shaft 15a can be passed through the opening A5, as will be described later. In the present embodiment, the bracket 5 is a plate member. The bracket 5 can be a frame of a vehicle.

On the other hand, the stopper 6 includes a rigid member 7 having an opening A6 formed therein, and an elastic member 8.

The rigid member 7 is a member formed of a rigid material. Here, the rigid material refers to a material that is not easily deformed by action of force. In the present embodiment, the rigid material is a metallic material. Examples of metallic materials include aluminum alloys, carbon steel, stainless steel, and other steels. The bolt shaft 15a can be passed through the opening A6, as will be described later.

The elastic member 8 includes a stopper body 9 configured to cover the rigid member 7, and positioning protrusions 10 continuous with the stopper body 9.

Each positioning protrusion 10 includes a shaft portion 11 extending to one side in the axial direction as part of the stopper body 9 and penetrating through the corresponding positioning hole A1, a bulging portion 12 continuous with an end of the shaft portion 11 so as to be prevented from detaching from the bracket 5, and a coating portion 13 provided on at least a surface of the bulging portion 12 and configured to be peelable.

The elastic member 8 is formed of an elastic material. In the present embodiment, the stopper body 9 and the positioning protrusions 10 are integrally molded by the elastic material. Specifically, the stopper body 9 is formed on both upper and lower surfaces of the rigid member 7. Each positioning protrusion 10 is continuous with part of the stopper body 9 that is formed on the lower surface of the rigid member 7. In the present embodiment, the elastic material is rubber.

In the present embodiment, the stopper 6 is fitted to the bracket 5. In the present embodiment, the stopper 6 is fitted to the bracket 5, by press-fitting the positioning protrusions 10 of the stopper 6 into the positioning holes A1 of the bracket 5. In the present embodiment, the bracket 5 and the stopper 6 are configured as a stopper bracket 1B, which includes the bracket 5 and the stopper 6 as will be described later.

As mentioned above, the anti-vibration device 1 according to the present embodiment connects the suspension member 30 to the vehicle body 40.

In the present embodiment, the anti-vibration device 1 is attached to the suspension member 30 by the outer cylinder 3. In the present embodiment, the anti-vibration body 1A penetrates through an attachment portion 31 of the suspension member 30. In the present embodiment, the outer cylinder 3 is press-fitted by pressing it against the attachment portion 31. Furthermore, in the present embodiment, the anti-vibration body 1A is prevented from detaching from the attachment portion 31 by the upper end portion 3b of the outer cylinder 3.

In the present embodiment, the anti-vibration device 1 is attached to the body 40 with a bolt 15. The bolt 15 includes a bolt shaft 15a, a bolt head 15b, and a lower pressing flange 15c.

The bolt shaft 15a penetrates through the anti-vibration device 1. The bolt shaft 15a is threaded (which is not illustrated). In the present embodiment, the bolt shaft 15a can be screwed upward to the body 40. In the present embodiment, the bolt head 15b is continuous with a rear end of the bolt shaft 15a via the lower pressing flange 15c. In the present embodiment, the lower pressing flange 15c of the bolt 15 is larger than the opening A5 of the bracket 5. This allows the lower pressing flange 15c of the bolt 15 to press the bracket 5 upward in the axial direction.

In the present embodiment, because the stopper 6 is fitted onto the bracket 5, it can be moved upward together with the bracket 5, by screwing the bolt 15 upward. Furthermore, in the present embodiment, because the stopper 6 is arranged between the anti-vibration body 1A and the bracket 5, it can be brought into contact with a lower end of the anti-vibration body 1A, by screwing the bolt 15 upward. In the present embodiment, the rigid member 7 of the stopper 6 can be brought into contact with a lower end 2e2 of the inner cylinder 2 of the anti-vibration body 1A.

On the other hand, in the present embodiment, an upper end of the anti-vibration body 1A can be brought into contact with a positioning portion 41 provided on the body 40. In the present embodiment, the positioning portion 41 can be brought into contact with an upper end 2e1 of the inner cylinder 2.

In the present embodiment, the stopper bracket 1B can be moved upward, by screwing the bolt 15 upward. By moving the stopper bracket 1B upward, the rigid member 7 of the stopper 6 can be brought into contact with the lower end 2e2 of the inner cylinder 2. This allows the anti-vibration body 1A to move upward together with the stopper bracket 1B. On the other hand, in the present embodiment, as the stopper bracket 1B is moved further upward, the upper end 2e1 of the inner cylinder 2 can be brought into contact with the positioning portion 41 provided on the body 40. Thus, in the present embodiment, the anti-vibration device 1A can be fitted between the body 40 and the stopper bracket 1B, with the bolt 15 being screwed in.

Next, an anti-vibration device manufacturing method according to an embodiment of the present disclosure will be described.

The anti-vibration device manufacturing method is an anti-vibration device manufacturing method for obtaining the anti-vibration device 1 of FIG. 1. The manufacturing method according to the present embodiment includes:

applying a coating agent C, which is configured to be peelable after solidification, to at least the bulging portion 12 of the positioning protrusion 10 extending to one side in the axial direction as part of the elastic member 8 provided in the stopper 6; and after solidification of the coating agent C, pressing the bulging portions 12 of the positioning protrusions 10 into the positioning holes A1 formed in the bracket 5, so as to prevent the bulging portions 12 from detaching from the bracket 5.

With reference to the drawings, the anti-vibration device manufacturing method according to an embodiment will be described in more detail below.

The anti-vibration device manufacturing method according to the present embodiment is a manufacturing method for obtaining the anti-vibration device 1. The anti-vibration device 1 is completed by fitting the components, along with the suspension member 30, to the body 40, with the bolt 15. The anti-vibration device manufacturing method includes three processes, that is, a first process, a second process, and a third process. Furthermore, the first process includes two processes, that is, a first process A and a first process B.

[First Process]

In the present embodiment, the first process is a stopper bracket assembly process. In the first process, the stopper 6 is fitted to the bracket 5 to thereby form the stopper bracket 1B. In the present embodiment, the first process further includes two processes: the first process A; and the first process B.

(First Process A)

The first process A is a coating treatment process (coating agent application process) of providing the coating portion 13 on each positioning protrusion 10. In the first process A, the coating agent C, which is configured to be peelable after solidification, is applied to at least the bulging portion 12 of the positioning protrusion 10 extending to one side in the axial direction as part of the elastic member 8 provided in the stopper 6.

The coating agent C forms the coating portion 13 on each positioning protrusion 10 through solidification. The coating portion 13 can be peeled by deformation of the positioning protrusion 10.

Specifically, as the coating agent C, a coating agent that, after solidification, has poor conformability to the elastic material forming each positioning protrusion 10 and can be peeled off by deformation of the elastic material is used. In the present embodiment, because the positioning protrusion 10 is formed of rubber, a coating agent that, after solidification, has poor conformability to the rubber and can be peeled off by deformation of the rubber is used as the coating agent C.

In the anti-vibration device manufacturing method according to the present embodiment, the coating agent C is preferably a rust inhibitor. Examples of such rust inhibitors include a water-soluble rust inhibitor paint. In the first process A according to the present embodiment, a water-soluble rust inhibitor paint is used as the coating agent C. Thus, in the present embodiment, the coating portion 13 can be formed, for example, by spray application of the water-soluble rust inhibitor paint.

In the anti-vibration device manufacturing method according to the present embodiment, it is preferable to apply the coating agent C to the entire positioning protrusions 10.

Figure 2A:
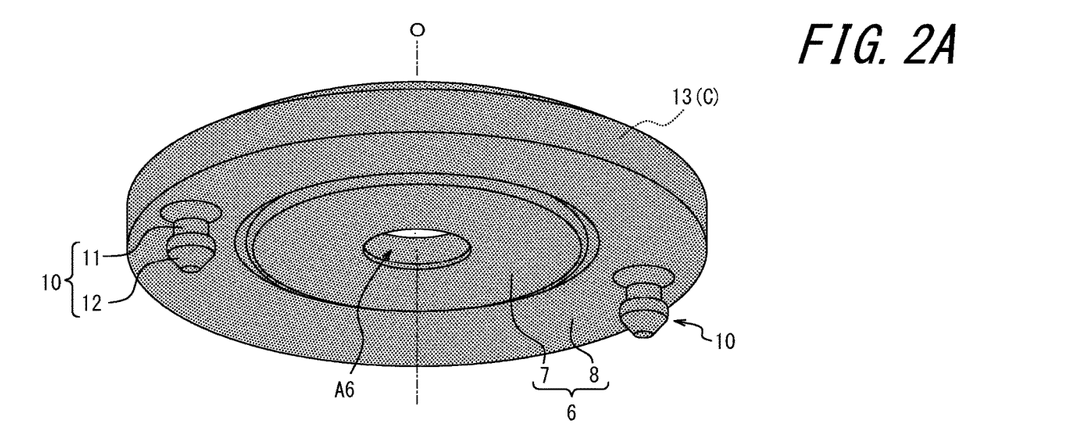
FIG. 2A is a perspective view illustrating a stopper used in the anti-vibration device of FIG. 1 from below.
Figure 2B:
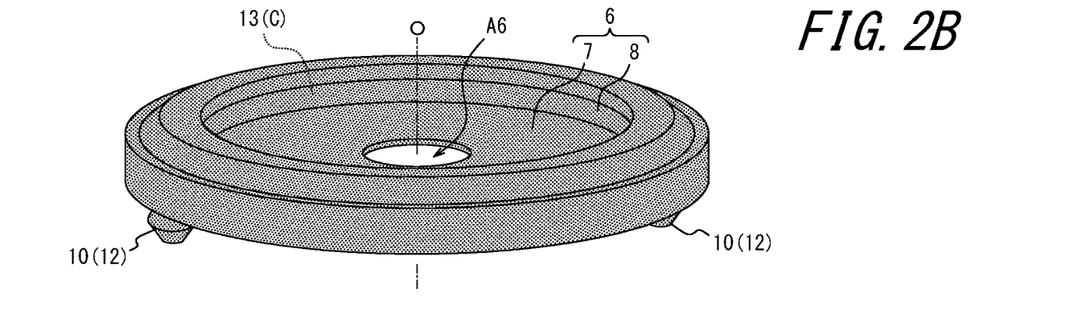
FIG. 2B is a perspective view illustrating the stopper of FIG. 2A from above.

Here, FIG. 2A is a perspective view illustrating the stopper 6 from below. FIG. 2B is a perspective view illustrating the stopper 6 from above. The stopper 6 is a stopper for an anti-vibration device according to an embodiment of the present disclosure. As illustrated by dot hatching (dot pattern) in FIG. 2A and FIG. 2B, in the first process A, the coating agent C is applied to the entire outer surface of the stopper 6.

(First Process B)

The first process B is a fastening process of fitting the positioning protrusions 10 into the positioning holes A1 (detachment prevention process). In the first process B, after the first process A has been completed and the coating agent C has solidified, the positioning protrusions 10 are pressed into the positioning holes A1 formed in the bracket 5, so as to prevent the bulging portions 12 from detaching from the bracket 5.

Figure 3:
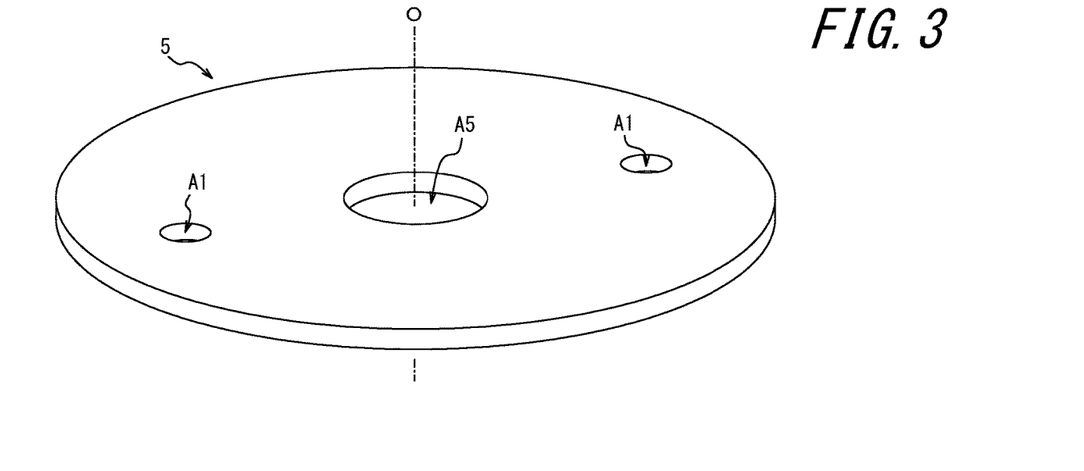
FIG. 3 is a perspective view illustrating a bracket used in the anti-vibration device of FIG. 1 from above.

FIG. 3 is a perspective view illustrating the bracket 5 from above. In the present embodiment, the bracket 5 is a disc-shaped plate. In the present embodiment, the bracket 5 has two positioning holes A1. The two positioning holes A1 are formed at positions corresponding to the positioning protrusions 10 of the stopper 6. In the present embodiment, the two positioning protrusions 10 are formed at positions facing each other in the perpendicular-to-axis direction across the opening A5 formed in the middle of the bracket 5.

Figure 4A:
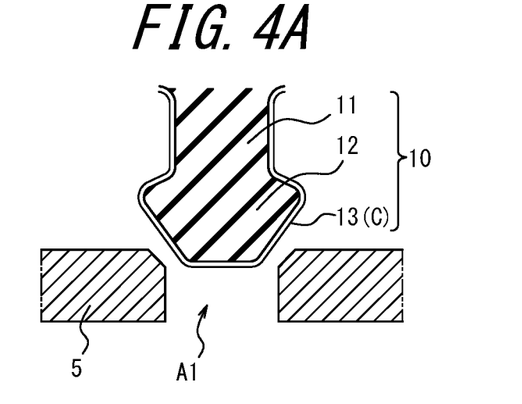
FIG. 4A is an enlarged cross-sectional view illustrating the process of fitting the stopper to the bracket of FIG. 1, in a state immediately before a positioning protrusion of the stopper is inserted into a positioning hole formed in the bracket.

Here, FIG. 4A illustrates a state immediately before a positioning protrusion 10 is inserted into a positioning hole A1. As illustrated in FIG. 4A, before the positioning protrusion 10 is inserted, the positioning protrusion 10 includes the coating portion 13.

Figure 4B:
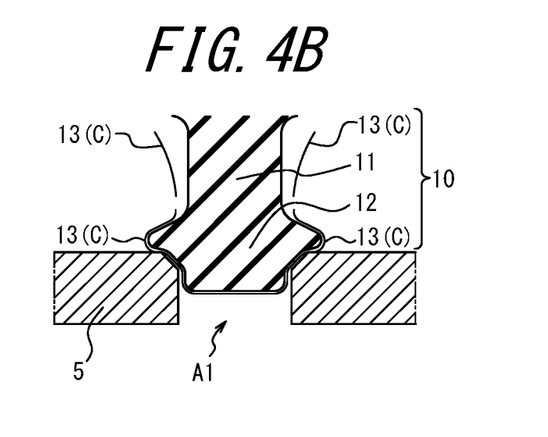
FIG. 4B is an enlarged cross-sectional view illustrating the process of fitting the stopper to the bracket of FIG. 1, in a state in which the positioning protrusion of the stopper is pressed into the positioning hole formed in the bracket.

Next, FIG. 4B illustrates a state in which the positioning protrusion 10 is being pressed into the positioning hole A1. As illustrated in FIG. 4B, when the bulging portion 12 of the positioning protrusion 10 is pressed into the positioning hole A1, the coating portion 13 comes into contact with the bracket 5. This allows the bulging portion 12 of the positioning protrusion 10 to be pressed smoothly into the positioning hole A1 via the coating portion 13. That is, in the present embodiment, the coating portion 13 functions as a lubricant. Accordingly, when the positioning protrusion 10 provided with the coating portion 13 is inserted into the positioning hole A1, the ease of fastening the stopper 6 and the bracket 5 together can be improved compared to a case in which the positioning protrusion 10 is directly press-fitted into the positioning hole A1 without using the coating portion 13.

Figure 4C:
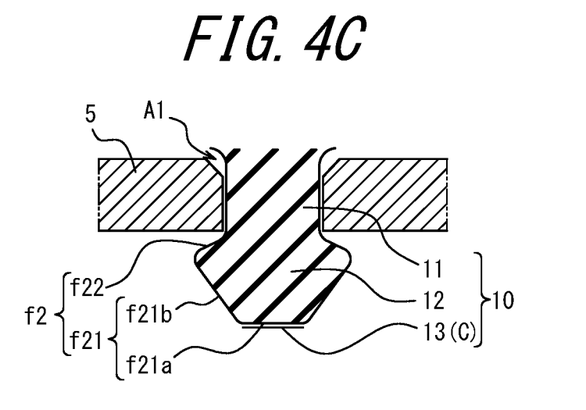
FIG. 4C is an enlarged cross-sectional view illustrating the process of fitting the stopper to the bracket of FIG. 1, in a state in which a bulging portion of the positioning protrusion of the stopper is prevented from detaching from the bracket.

FIG. 4C illustrates a state in which the bulging portion 12 of the positioning protrusion 10 is prevented from detaching from the bracket 5. As illustrated in FIG. 4C, when the bulging portion 12 of the positioning protrusion 10 is press-fitted into the positioning hole A1, the bulging portion 12 penetrates the positioning hole A1 and projects (to be exposed) from a lower side of the bracket 5. This prevents the bulging portion 12 of the positioning protrusion 10 from being detaching from the bracket 5.

Figure 5:
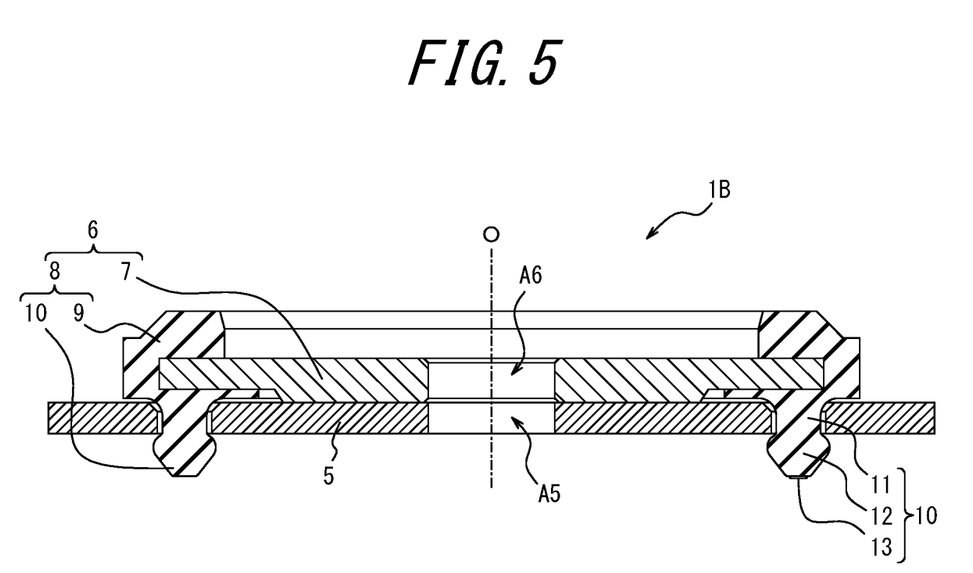
FIG. 5 is a cross-sectional view illustrating a stopper bracket used in the anti-vibration device of FIG. 1.

Thus, according to the anti-vibration device manufacturing method according to the present embodiment, the stopper 6 is fitted to the bracket 5 (they are temporarily assembled), so as to form the stopper bracket 1B that includes the stopper 6 and the bracket 5, as illustrated in FIG. 5. The stopper bracket 1B can be handled as a single component in which the stopper 6 and bracket 5 are temporarily assembled, before being fastened as the anti-vibration device 1.

In particular, as illustrated in FIG. 4B, the coating portion 13 can be peeled off by deformation of the positioning protrusion 10, when the bulging portion 12 of the positioning protrusion 10 is pressed so as to be press-fitted into the positioning hole A1. Accordingly, as illustrated in FIG. 4C, after the bulging portion 12 has been prevented from detaching from the bracket 5, the coating portion 13, which functions like a lubricant during the press-fitting, is peeled off from the positioning protrusion 10 due to deformation of the positioning protrusion 10 that occurs during the press-fitting. As a result, after the positioning protrusion 10 has been press-fitted, the positioning protrusion 10 is more firmly prevented from detaching from the bracket 5, compared with a case in which a lubricant is applied to the positioning protrusion 10. That is, according to the manufacturing method of the present embodiment, the detaching force required to detach the positioning protrusion 10 is greater than in a case in which a lubricant is applied. Hence, preventing the bulging portion 12 of the positioning protrusion 10 from detaching from the bracket 5 prevents easy separation between the stopper 6 and the bracket 5.

Thus, according to the first process of the present embodiment, it is possible to easily obtain the stopper bracket 1B in which easy separation between the stopper 6 and the bracket 5 is prevented, while the ease of fastening the stopper 6 and the bracket 5 together is improved.

[Process 2]

In the present embodiment, the second process is a suspension-side fastening process. In the second process, the anti-vibration body 1A is attached to the suspension member 30. In the present embodiment, for example, the anti-vibration body 1A is pressed so as to be press-fitted into the attachment portion 31 of the suspension member 30, as described above. This allows the anti-vibration body 1A to be attached to the suspension member 30 as illustrated in FIG. 1.

[Process 3]

In the present embodiment, the third process is a body-side fastening process. In the third process, the anti-vibration body 1A, along with the stopper bracket 1B, is attached to the body 40, as illustrated in FIG. 1. In the present embodiment, the third process includes, for example, aligning the anti-vibration body 1A attached to the suspension member 30 with the positioning portion 41 of the body 40, placing the stopper bracket 1B against a lower end portion of the anti-vibration body 1A (elastic body 4) and passing the bolt shaft 15a through the anti-vibration body 1A, and tightening the bolt 15 so as to fit the anti-vibration device 1, along with the suspension member 30, to the body.

According to the anti-vibration device manufacturing method of the present disclosure, the stopper 6 can be fitted to the bracket 5 by the following easy work. That is, the coating agent C, which is configured to be peelable after solidification, is applied to the positioning protrusions 10 provided in the stopper 6, and after solidification of the coating agent C, the bulging portions 12 of the positioning protrusions 10 are pressed into the positioning holes A 1 formed in the bracket 5, so as to prevent the bulging portions 12 from detaching from the bracket 5, and thus the stopper 6 can be fitted to the bracket 5. Furthermore, the coating portions 13 are peeled off from the positioning protrusions 10 by deformation of the positioning protrusions 10 that occurs during press-fitting, so that the easy separation between the stopper 6 and the bracket 5 is prevented. Therefore, the bracket 5 and the stopper 6 do not easily separate from each other, even when the bracket 5 and the stopper 6 are handled in a fitted state, as is the case with the stopper bracket 1B.

That is, according to the anti-vibration device manufacturing method of the present embodiment, the bracket 5 and the stopper 6 can be fastened together so that easy separation between the stopper 6 and the bracket 5 is prevented, while the ease of fastening the stopper 6 and the bracket 5 together is improved. Thus, according to the anti-vibration device manufacturing method of the present embodiment, the anti-vibration device 1 can be manufactured so that easy separation between the stopper 6 and the bracket 5 is prevented, while the ease of fastening the stopper 6 and the bracket 5 together is improved. Thus, according to the anti-vibration device manufacturing method of the present embodiment, it is possible to obtain the anti-vibration device in which easy separation between the stopper 6 and the bracket 5 is prevented, while the ease of fastening the stopper 6 and the bracket 5 together is improved.

In particular, according to the first process of the present embodiment, the bracket 5 and the stopper 6 can be fastened together so that easy separation between the stopper 6 and the bracket 5 is prevented, while the ease of fastening the stopper 6 and the bracket 5 together is improved. Accordingly, according to the first process of the present embodiment, the stopper bracket 1B can be manufactured so that the easy separation between the stopper 6 and the bracket 5 is prevented, while the ease of fastening the stopper 6 and the bracket 5 together is improved.

According to the anti-vibration device manufacturing method of the present embodiment, the coating agent C is a rust inhibitor. In this case, in manufacturing the stopper 6, the coating portions 13 can be formed by applying the rust inhibitor to the positioning protrusions 10, in conjunction with applying an existing rust inhibitor, such as a water-soluble rust inhibitor paint, to the rigid member 7. This allows the work process of forming the coating portions 13 to be included in the existing work process in the manufacture. This also allows the existing material used during the manufacture to be commonly used as a material forming the coating portions 13. In this case, therefore, the manufacturing method is superior in terms of workability and cost-effectiveness.

According to the anti-vibration device manufacturing method of the present embodiment, as described with reference to FIG. 2A and so forth, the coating agent C is applied to the entire positioning protrusions 10. In this case, for example, in a case in which a rust inhibitor is used as the coating agent C, by both applying the coating agent C to the rigid member 7 and applying the coating agent C to the positioning protrusions 10, the rust inhibitor portion of the rigid member 7 and the coating portions 13 of the positioning protrusions 10 can be formed all together by a sequence of work. In this case, there is no need to separately apply the coating agent C to the positioning protrusions 10. Furthermore, in this case, the unnecessity of applying the coating agent C separately omits the need for a masking tape or the like. In this case, therefore, the manufacturing method is even more superior in terms of workability and cost-effectiveness.

As illustrated in FIG. 2A and so forth, the stopper 6 includes the rigid member 7 having the opening A6 formed therein, and the elastic member 8. The elastic member 8 includes the stopper body 9 configured to cover the rigid member 7, and the positioning protrusions 10 continuous with the stopper body 9. Each positioning protrusion 10 includes the shaft portion 11 extending to one side in the axial direction as part of the stopper body 9 and configured to be able to penetrate through the corresponding positioning hole A5 formed in the bracket 5, the bulging portion 12 continuous with the end of the shaft portion 11 so as to be prevented from detaching from the bracket 5, and the coating portion 13 provided on at least the surface of the bulging portion 12 and configured to be peelable.

As described above, according to the stopper 6 of the present embodiment, the stopper 6 can be fitted to the bracket 5 by easy work, and the bracket 5 and the stopper 6 do not easily separate from each other, even when they are handled as the stopper bracket 1B, with the positioning protrusions 10 being prevented from detaching from the bracket 5. That is, by using the stopper 6 that is fitted to the bracket 5, easy separation between the stopper 6 and the bracket 5 is prevented, while the ease of fastening the stopper 6 and the bracket 5 together is improved. The stopper 6 is therefore suitable for use when manufacturing an anti-vibration device so that easy separation between the stopper and the bracket is prevented, while the ease of fastening the stopper and the bracket together is improved. Thus, according to the stopper for an anti-vibration device of the present embodiment, it is possible to obtain the anti-vibration device in which easy separation between the stopper and the bracket is prevented, while the ease of fastening the stopper and the bracket together is improved.

In the present embodiment, at least part of the rigid member 7, more specifically, part thereof that is near an outer periphery of the rigid member 7, is covered. Specifically, the stopper body 9 is annularly provided, so as to surround the opening A6 formed in the middle of the rigid member 7 in the circumferential direction around the entire circumference. The shape of the stopper body 9 can, however, be changed as required.

In the stopper 6, the coating portions 13 are formed of a rust inhibitor. In this case, because an existing rust inhibitor, such as a water-soluble rust inhibitor paint, can be used, the stopper for an anti-vibration device is superior in terms of manufacturability and cost-effectiveness.

Furthermore, in the stopper 6, the coating portions 13 are formed over the entire positioning protrusions 10. In this case, the stopper for an anti-vibration device is even more superior in terms of manufacturability and cost-effectiveness.

According to the anti-vibration device 1 of the present embodiment, the ease of fastening the stopper 6 and the bracket 5 together is improved by the positioning protrusions 10 being pressed into the positioning holes A1 via the coating portions 13, while easy separation between the stopper 6 and the bracket 5 is prevented by the coating portions 13 being peeled off from the positioning protrusions by the pressing-in. In particular, in the present embodiment, for example, part of each coating portion 13 remains on the corresponding positioning protrusion 10. In this case, the coating portions 13 can be visible as a marker indicating that the bracket 5 and the stopper 6 will not easily separate from each other, for example, even when they are handled as the stopper bracket 1B, with the positioning protrusions 10 being prevented from detaching from the bracket 5, as described above. In this case, the coating portions 13 remaining on the positioning protrusions 10 are small in relation to the entire positioning protrusions 10, so that the effect of the partially remaining coating portions 13 functioning as a lubricant is smaller than when a lubricant is applied to the positioning protrusions 10. Accordingly, in the anti-vibration device 1 in which the coating portions 13 partially remain, even in a case in which the bracket 5 and the stopper 6 are disassembled from a state in which the bracket 5 and the stopper 6 are temporarily assembled, and then fastened together, the stopper 6 and the bracket 5 can be easily fastened together. Once the positioning protrusions 10 have been press-fitted, the positioning protrusions 10 are more firmly prevented from detaching from the bracket 5 than in a case in which a lubricant is applied to the positioning protrusions 10. Thus, according to the stopper for an anti-vibration device of the present embodiment, it is possible to obtain the anti-vibration device in which easy separation between the stopper and the bracket is prevented, while the ease of fastening the stopper and the bracket together is improved.

In a case in which the coating portions 13 remain, each coating portion 13 is preferably positioned on the surface of the corresponding bulging portion 12 that is located on one side in the axial direction.

With reference to FIG. 4C, in the anti-vibration device 1 according to the present embodiment, the surface f2 of a bulging portion 12 is formed by a lower surface f21 and an upper surface f22. In the present embodiment, the axial dimension of the bulging portion 12 is maximum between the lower surface f21 and the upper surface f22. In the present embodiment, the coating portion 13 remains on the lower surface f21.

The lower surface f21 can shrink inward in the perpendicular-to-axis direction as it extends downward. In the present embodiment, the lower surface f21 is formed by a lower end surface f21a, and a first inclined surface f21b that tapers toward the lower end surface f21a. In this case, the coating portion 13 may be left on at least one of the lower end surface f21a and the first inclined surface f21b. Preferably, as illustrated in FIG. 4C, the coating portion 13 is left on the lower end surface f21a of the bulging portion 12. In this case, the coating portion 13 can be visible, for example, as a decoration on the lower end surface f21a. This can make the coating portion 13 less noticeable. The lower end surface f21a can be a point (lower end point) instead of a surface. Furthermore, the lower surface f21 can be a dome-shaped surface that projects downward.

The upper surface f22 can expand outward in the axial direction as it extends downward. With reference to FIG. 4c, in the present embodiment, the upper surface f22 is formed by a second inclined surface that that widens downward. The upper surface f22 can extend to the outer side in the perpendicular-to-axis direction in parallel to the perpendicular-to-axis direction. In this case, the upper surface f22 can be hidden behind the lower surface f21 by coming into surface contact with the bracket 5.

In the present embodiment, the coating portion 13 remains on the lower surface f21 of the bulging portion 12 that first contacts against the bracket 5 when the positioning protrusion 10 is pressed in, so that the positioning protrusion 10 can be pressed in smoothly against the positioning hole A1. Furthermore, because the coating portion 13 does not remain on any surface other than the lower surface f21 of the bulging portion 12, the positioning protrusion 10 is more firmly prevented from detaching from the bracket 5. Thus, by having the coating portion 13 remain on the lower surface f21 of the bulging portion 12, easy separation between the stopper 6 and the bracket 5 is even more prevented, while the ease of fastening the stopper 6 and the bracket 5 together is improved.

Furthermore, in the anti-vibration device 1 according to the present embodiment, the coating portions 13 are formed of a rust inhibitor. In this case, the anti-vibration device is superior in terms of manufacturability and cost-effectiveness.

Moreover, in the anti-vibration device 1 according to the present embodiment, each coating portion 13 is located on the lower surface f21 of the corresponding bulging portion 12. In this case, easy separation between the stopper 6 and the bracket 5 is even more prevented, while the ease of fastening the stopper 6 and the bracket 5 together is improved.

The above description is of an exemplary embodiment of the present disclosure, and various changes can be made without departing from the scope of the claims. For example, in the embodiment described above, the anti-vibration device 1 is fitted to the vehicle body 40 with the bolt 15, but the method of fitting the anti-vibration device 1 to the body 40 is not limited to this. The anti-vibration device 1 can be fitted to the body 40, for example, by passing a threaded shaft provided in the body 40 through the through hole A2 and using a nut threaded onto the threaded shaft. The anti-vibration device 1 is not limited to the one formed by fitting one end of the anti-vibration device 1 in the axial direction to the body 40 through the bolt 15. For example, the anti-vibration device 1 can be configured separately from the body 40, by replacing the body 40 with another bracket.

REFERENCE SIGNS LIST

1 Anti-vibration device
1A Anti-vibration body
1B Stopper bracket
2 Inner cylinder
3 Outer cylinder
4 Elastic body
5 Bracket
6 Stopper
7 Rigid member
8 Elastic member
9 Stopper body
10 Positioning protrusion
11 Shaft portion
12 Bulging portion
13 Coating portion
15 Bolt
30 Suspension member
40 Body
A1 Positioning hole
C Coating agent
O Axis line of anti-vibration device

The invention claimed is:

1. An anti-vibration device manufacturing method for obtaining the anti-vibration device including: an anti-vibration body including an inner cylinder, an outer cylinder, and an elastic body connecting the inner cylinder and the outer cylinder; a bracket arranged on one side of the anti-vibration body in an axial direction; and a stopper arranged between the anti-vibration body and the bracket, the anti-vibration device manufacturing method comprising:
    applying a coating agent to at least a bulging portion of a positioning protrusion extending to one side in the axial direction as part of an elastic member provided in the stopper, the coating agent being configured to be peelable after solidification; and
    after solidification of the coating agent, pressing the bulging portion of the positioning protrusion into a positioning hole formed in the bracket, so as to prevent the bulging portion from detaching from the bracket.

2. The anti-vibration device manufacturing method according to claim 1, wherein the coating agent is a rust inhibitor.

3. The anti-vibration device manufacturing method according to claim 1, wherein the coating agent is applied to the entire positioning protrusion.

4. A stopper for an anti-vibration device that is to be used in the anti-vibration device including: an anti-vibration body including an inner cylinder, an outer cylinder, and an elastic body connecting the inner cylinder and the outer cylinder; a bracket arranged on one side of the anti-vibration body in an axial direction; and the stopper arranged between the anti-vibration body and the bracket, the stopper comprising:
    a rigid member having an opening formed therein; and
    an elastic member, wherein
    the elastic member includes a stopper body configured to cover the rigid member, and a positioning protrusion continuous with the stopper body, and
    the positioning protrusion includes a shaft portion extending to one side in the axial direction as part of the stopper body and configured to be able to penetrate a positioning hole formed in the bracket, a bulging portion continuous with an end of the shaft portion so as to be prevented from detaching from the bracket, and a coating portion provided on at least a surface of the bulging portion and configured to be peelable.

5. The stopper for an anti-vibration device according to claim 4, wherein the coating portion is formed of a rust inhibitor.

6. An anti-vibration device comprising:
    an anti-vibration body including an inner cylinder, an outer cylinder, and an elastic body connecting the inner cylinder and the outer cylinder;
    a bracket arranged on one side of the anti-vibration body in an axial direction; and
    a stopper arranged between the anti-vibration body and the bracket, wherein
    the bracket has a positioning hole formed therein that penetrates in the axial direction,
    the stopper includes a rigid member having an opening formed therein, and an elastic member,
    the elastic member includes a stopper body configured to cover the rigid member, and a positioning protrusion continuous with the stopper body, and
    the positioning protrusion includes a shaft portion extending to one side in the axial direction as part of the stopper body and configured to penetrate the positioning hole, a bulging portion continuous with an end of the shaft portion so as to be prevented from detaching from the bracket, and a coating portion provided on at least a surface of the bulging portion and configured to be peelable.

7. The anti-vibration device according to claim 6, wherein the coating portion is formed of a rust inhibitor.

8. The anti-vibration device according to claim 6, wherein the coating portion is positioned on the surface of the bulging portion that is located on one side in the axial direction.

9. The anti-vibration device manufacturing method according to claim 2, wherein the coating agent is applied to the entire positioning protrusion.

10. The anti-vibration device according to claim 7, wherein the coating portion is positioned on the surface of the bulging portion that is located on one side in the axial direction.

* * * * *